United States Patent [19]

Deguchi

[11] Patent Number: 5,084,730
[45] Date of Patent: Jan. 28, 1992

[54] OPERATION INPUT DEVICE FOR IMAGE FORMING MACHINE

[75] Inventor: Masanobu Deguchi, Nara, Japan

[73] Assignee: Sharp Kabushiki Kaisha, Osaka, Japan

[21] Appl. No.: 321,878

[22] Filed: Mar. 10, 1989

[30] Foreign Application Priority Data

Mar. 10, 1988 [JP] Japan .................................. 63-57689

[51] Int. Cl.$^5$ ........................ G03B 27/62; H01H 1/10
[52] U.S. Cl. ........................................ 355/75; 200/512
[58] Field of Search ................ 355/209, 218, 230, 75; 200/512; 340/706, 712

[56] References Cited

U.S. PATENT DOCUMENTS

| | | | |
|---|---|---|---|
| 4,302,648 | 11/1981 | Sado et al. | 200/512 |
| 4,568,918 | 2/1986 | Edel | 200/512 X |
| 4,746,953 | 5/1988 | Knoot | 355/311 |
| 4,771,143 | 9/1988 | Hoffmann | 200/512 |
| 4,870,458 | 9/1989 | Shibuya et al. | 355/200 |

FOREIGN PATENT DOCUMENTS

| | | | |
|---|---|---|---|
| 0023066 | 1/1987 | Japan | 355/209 |
| 0129834 | 6/1987 | Japan | 355/218 |

*Primary Examiner*—A. T. Grimley
*Assistant Examiner*—Nestor R. Ramirez

[57] ABSTRACT

An operation input device is mounted onto a machine having an image-reading portion with a glass plate. The device includes an operation input portion that optionally specifies each of a plurality of functions of the machine by manually operable switches, wherein the operation input portion is disposed in an image-non-reading region of the image-reading portion on the glass plate outside of the image-reading region of the image-reading portion, the image-non-reading region being a region where the image-reading is not concerned within the image-reading portion on the glass plate.

7 Claims, 1 Drawing Sheet

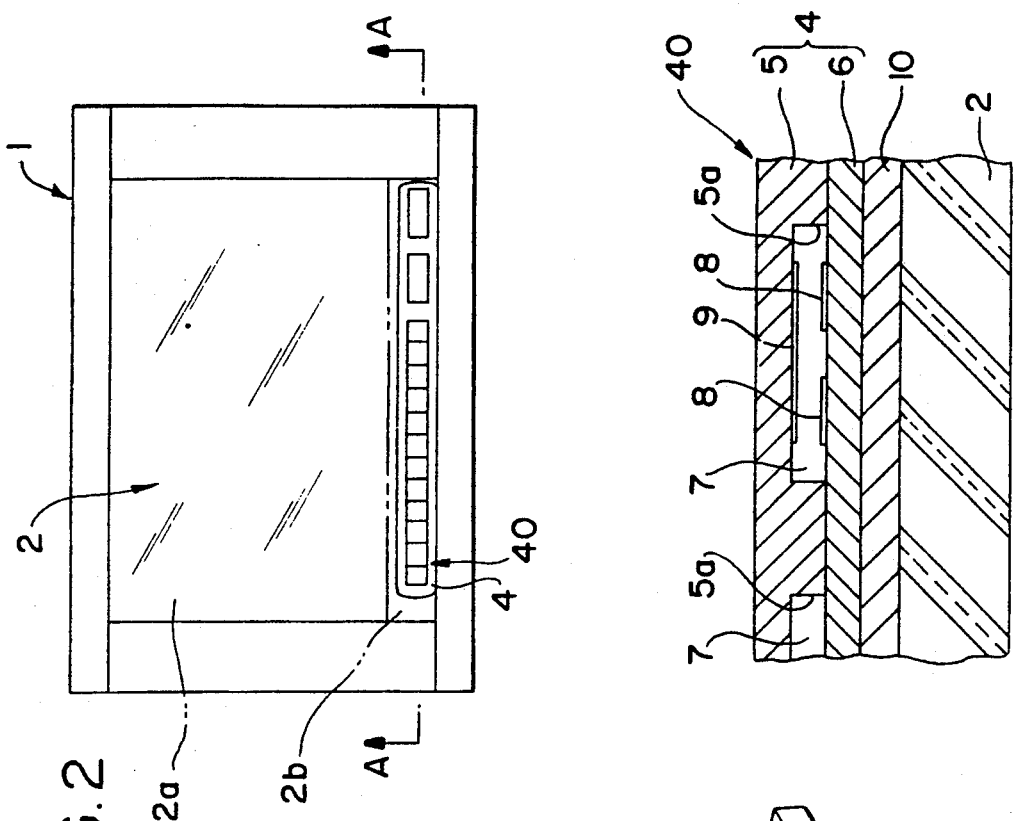
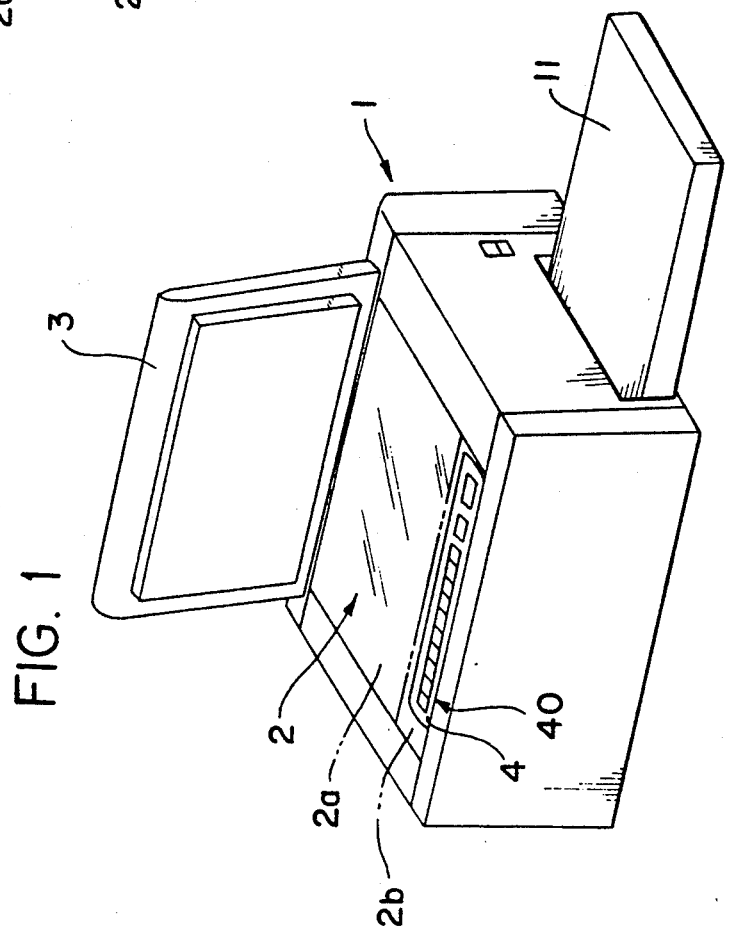

OPERATION INPUT DEVICE FOR IMAGE FORMING MACHINE

BACKGROUND OF THE INVENTION

1. Field of the Invention

This invention relates to an operation input device that is mounted onto copying machines, facsimile machines or the like having a table glass in the imagereading portion thereof.

2. Description of the Prior Art

Office machines such as copying machines, facsimile machines or the like are required to be miniaturized because the space to be occupied by these machines must be designed as small as possible. In particular, machines that have an image-reading portion and a glass plate on which a manuscript is to be placed in the image-reading portion need to be miniaturized to the same size as the table glass.

Such copying machines comprise, in a compact manner, an optical system for irradiating the manuscript on the glass plate with light, a driving means for driving the optical system, a photosensitive drum for receiving the light reflected from the manuscript, and a power supply portion for supplying power to each of the working portions of the copying machines. These copying machines also comprise an operation input device that has an operation input portion for optionally specifying each function of the copying machines by manually operable switches.

The operation input portion of a conventional operation input device is located at the top surface on the front side of the outer casing of the copying machines for its visibility and operability. The inside of the area in which the operation input portion is located is nearly hollow and does not effectively function as a part of the copying machine.

Because of the ineffective space inside the area in which the operation input portion, including switches, is located, the size of the copying machines becomes large, in spite of an effort to miniaturize the copying machines by highly integrating the optical system and the optical system-driving means.

SUMMARY OF THE INVENTION

The operation input device of this invention, which overcomes the above-discussed and numerous other disadvantages and deficiencies of the prior art, is a device that is mounted onto a machine having an image-reading portion with a glass plate, the device comprising an operation input portion for optionally specifying each function of the machine by switches with manual operation, wherein the operation input portion is disposed in a non-image reading region of the image-reading portion on the glass plate outside of the image-reading region of the image-reading portion, the a non-image reading region being a region where the image-reading is not concerned within the image-reading portion on the glass plate.

In a preferred embodiment, the operation input portion is constituted by a sheet switch or a transparent touch panel.

In a preferred embodiment, the sheet switch comprises a thin elastic sheet having a plurality of void portions therein, a pair of electrodes and a common electrode being disposed to face each other with a predetermined gap within each of the void portions.

In a preferred embodiment, the machine is a copying machine or a facsimile machine.

Thus, the invention described herein makes possible the objective of providing an operation input device in which the operation input portion is disposed in the non-image-reading region on the glass plate outside of the image-reading region so that the size of the machine can be reduced by the space inside of the area, on the top surface of the front side of the machine casing, in which a conventional operation input portion is located, thereby attaining a miniaturization of machines onto which the operation input device is to be mounted.

BRIEF DESCRIPTION OF THE DRAWINGS

This invention may be better understood and its numerous objects and advantages will become apparent to those skilled in the art by reference to the accompanying drawings as follows:

FIG. 1 is a perspective view showing an operation input device of this invention that is mounted onto a copying machine;

FIG. 2 is a plane view showing the operation input device of FIG. 1 mounted onto a glass plate of the copying machine; and FIG. 3 is a sectional view taken along line A—A of FIG. 2.

DESCRIPTION OF THE PREFERRED EMBODIMENTS

FIG. 1 shows the operation input device 40 of this invention, which is mounted onto a copying machine 1. The copying machine 1 includes an image-reading region 2a with a glass plate 2 and a cover 3 for covering the glass plate 2, in which light radiated from an optical system (not shown) is transmitted through an image-reading region 2a of the glass plate 2 to irradiate the manuscript on the glass plate 2 and then the light reflected from the manuscript is led onto a photoconductive drum (not shown) through the image-reading region 2a. The copying machine further includes driving means for driving the optical system, paper-feeding means for supplying transferring papers, transferring means for transferring a toner image from the photoconductive drum onto the transferring paper, developing means for developing the toner image on the transferring paper, fixing means for fixing the toner image to the transferring paper, and paper-discharging means (which are all not shown), through which transfer operation for transferring the toner image from the photosensitive drum onto the transferring paper and fixing operation for fixing the toner image to the transferring paper are performed on the transferring paper supplied from a paper-feeding cassette 11. The above-mentioned optical system driving means, photosensitive drum, paper-feeding means, transferring means, developing means, fixing means, and paper-discharging means are integrated to a high degree of density.

The operation input device 40 of this invention that is mounted onto the copying machine 1 has an operation input portion optionally specifying the following functions of the copying machine by switches with manual operation; that is, the functions of adjusting of the toner density, specifying the number of copies to be printed, clearing the number of copies printed, and start printing. The operation input portion is provided as a thin type sheet switch 4 that is disposed as shown in FIG. 2, on non-image-reading region 2b on the glass plate 2 outside of the image-reading region 2a. The non-imagereading region 2b is a region where image-reading does not occur.

The sheet switch 4 includes, as shown in FIG. 3, elastic sheets 5 and 6 stuck together. These sheets are made of, for example, PET (polystyrene terephthalate). There are a plurality of concave portions 5a at regular intervals in the sheet 5, resulting in a plurality of void portions 7 between the sheets 5 and 6. In each of these void portions 7, a pair of electrodes 8, 8 are disposed a spaced distance apart on the sheet 5, while a common electrode 9 is disposed on the inner surface of the concave portion 5a of the sheet 5 so as to face both the electrodes 8 and 8. Since there is a gap between the electrode 9 and each of the electrodes 8 and 8, the electrodes 8 and 8 are not electrically connected to each other in this state. When the sheet 5 is pushed toward the sheet 6 and the electrode 9 comes into contact with the electrodes 8 and 8, the electrodes 8 and 8 are electrically connected to each other through the electrode 9. In this manner, the sheet switch 4 forms a switch group having a plurality of switches integrally formed by the electrodes 8, 8 and 9 that are disposed in each of the void portions 7. The sheet switch 4 is fixed to the glass plate 2 by the use of an adhesive tape 10, both surfaces of which are adhesive.

As mentioned above, because the sheet switch 4 constituting the operation input portion, is placed in the non-image-reading region 2b on the glass plate 2, it is possible to remove an ineffective space that occurs inside of the top surface of the front side (i.e., outside of the glass plate) of a conventional copying machine, thereby attaining a reduction of the size of the copying machine by this space, so that the size of the copying machine can be made as small as the size of the glass plate 2. The space inside of the area on the top surface of the front side of the copying machine where a conventional operation input device is placed is hollow so that there is no inconvenience caused in performance of the copying machine even though the space is removed. Moreover, because the sheet switch 4 is placed in the non-image-reading region 2b on the glass plate 2 outside of the image-reading region 2a and the image-reading region 2a is secured on the glass plate 2, there is no hindrance in reading the image of the manuscript. Moreover, the sheet switch 4 is so thin that there is no disadvantage of light escaping between the sheet switch 4 and the cover 3 when the cover 3 is closed over the glass plate 2. In addition, because the sheet switch 4 is placed in the non-image-reading region 2b which is positioned in the area on the top surface of the front side of the copying machine where the image-reading is not concerned, visibility and operability of the operation input portion can be sufficiently secured.

The switch that functions as the operation input portion is not limited to the sheet switch 4, but it can be a switch referred to as a transparent touch panel. Moreover, it is not necessary to input through the sheet switch 4 when all of the functions of the copying machine 1 must be specified, but only a part of the switch functioning as the operation input portion can be constituted by the sheet switch 4. Moreover, with an operation input device having not only the above-mentioned operation input portion but also a display means for displaying the contents of the selected specification, it is preferable that a thin liquid crystal displaying means is used as the above-mentioned display means and disposed in the non-image-reading region 2b on the glass plate 2 of the copying machine 1.

Although the above-mentioned example only discloses the copying machine 1 onto which the operation input device 40 is mounted, this invention is, of course, also applicable to facsimile machines having a glass plate, resulting in miniature facsimile machines.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An operation input device for an image reading machine comprising:
   a platen for receiving a document to be read by said image reading machine, said platen including an image reading region and a non-image reading region; and
   an operation input panel formed on said non-image reading region, said operation input panel enabling manual input of a plurality of machine functions therethrough;
   wherein an overall size of said image reading machine is reduced by forming said operation input panel on said non-image reading region.

2. An operation input device according to claim 1, wherein said operation input panel is a sheet switch.

3. An operation input device according to claim 1, wherein said operation input panel is a transparent touch panel.

4. An operation input device according to claim 2, wherein said sheet switch comprises a first elastic thin sheet having a plurality of recesses formed therein, a common electrode formed within each of said plurality of recesses, a second elastic thin sheet formed over said first elastic thin sheet, and a plurality of pairs of electrodes disposed to face each of said common electrodes with a predetermined gap therebetween.

5. An operation input device according to claim 1, wherein said machine is a copying machine.

6. An operation input device according to claim 1, wherein said machine is a facsimile machine.

7. An operation input device according to claim 1, wherein said non-image reading region is formed along a linear edge of said image reading region.

* * * * *